(12) United States Patent
Birk et al.

(10) Patent No.: US 7,679,822 B2
(45) Date of Patent: Mar. 16, 2010

(54) BROADBAND LASER ILLUMINATION DEVICE FOR A SCANNING MICROSCOPE WITH OUTPUT STABILIZATION

(75) Inventors: Holger Birk, Meckesheim (DE); Rafael Storz, Bammental (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 12/330,954

(22) Filed: Dec. 9, 2008

(65) Prior Publication Data
US 2009/0086315 A1 Apr. 2, 2009

Related U.S. Application Data

(60) Division of application No. 11/580,065, filed on Oct. 13, 2006, now abandoned, which is a continuation of application No. 11/034,888, filed on Jan. 14, 2005, now Pat. No. 7,123,408, which is a division of application No. 09/881,062, filed on Jun. 15, 2001, now Pat. No. 6,888,674.

(30) Foreign Application Priority Data

Jun. 17, 2000 (DE) ................... 100 30 013
Mar. 29, 2001 (DE) ................... 101 15 509

(51) Int. Cl.
*G02B 21/06* (2006.01)
(52) U.S. Cl. ...................... 359/385
(58) Field of Classification Search ........... 359/368, 359/385, 388; 385/122–124, 126–128
See application file for complete search history.

(56) References Cited

U.S. PATENT DOCUMENTS 3,720,822 A 3/1973 Rochester et al.
4,011,403 A 3/1977 Epstein et al.
4,063,106 A 12/1977 Ashkin et al.
5,034,613 A 7/1991 Denk et al.
5,155,792 A 10/1992 Vali et al.
5,161,053 A 11/1992 Dabbs (Continued)

FOREIGN PATENT DOCUMENTS

DE 44 14 940 A1 11/1995

(Continued)

OTHER PUBLICATIONS

U.S. Appl. No. 09/881,062, filed Jun. 15, 2001, Birk et al.

(Continued)

*Primary Examiner*—Alessandro Amari
*Assistant Examiner*—Mark Consilvio
(74) *Attorney, Agent, or Firm*—Foley & Lardner LLP

(57) ABSTRACT

The arrangement for examining microscope preparations with a scanning microscope comprises a laser (1) and an optical means (12) which images the light generated by the laser (1) onto a specimen (13) that is to be examined. Provided between the laser (1) and the optical means (12) is an optical component (3, 20) that spectrally spreads, with a single pass, the light generated by the laser (1). The optical component (3, 20) is made of photonic band-gap material. It is particularly advantageous if the photonic band-gap material is configured as a light-guiding fiber (20).

5 Claims, 5 Drawing Sheets

U.S. PATENT DOCUMENTS

| | | | |
|---|---|---|---|
| 5,272,330 | A | 12/1993 | Betzig et al. |
| 5,286,970 | A | 2/1994 | Betzig et al. |
| 5,286,971 | A | 2/1994 | Betzig et al. |
| 5,288,996 | A | 2/1994 | Betzig et al. |
| 5,288,998 | A | 2/1994 | Betzig et al. |
| 5,350,921 | A | 9/1994 | Aoyama et al. |
| 5,537,247 | A | 7/1996 | Xiao |
| 5,541,613 | A | 7/1996 | Lam et al. |
| 5,777,732 | A | 7/1998 | Hanninen et al. |
| 5,786,890 | A | 7/1998 | Noh |
| 5,796,477 | A | 8/1998 | Teich et al. |
| 5,799,126 | A | 8/1998 | Nagatani et al. |
| 5,802,236 | A | 9/1998 | DiGiovanni et al. |
| 5,861,984 | A | 1/1999 | Schöppe |
| 5,862,287 | A | 1/1999 | Stock et al. |
| 5,903,688 | A | 5/1999 | Engelhardt et al. |
| 5,967,653 | A | 10/1999 | Miller et al. |
| 5,995,281 | A | 11/1999 | Simon et al. |
| 5,999,548 | A | 12/1999 | Mori et al. |
| 6,002,522 | A | 12/1999 | Todori et al. |
| 6,005,709 | A | 12/1999 | Silver |
| 6,007,996 | A | 12/1999 | McNamara et al. |
| 6,052,238 | A | 4/2000 | Ebbesen et al. |
| 6,055,097 | A | 4/2000 | Lanni et al. |
| 6,097,870 | A | 8/2000 | Ranka et al. |
| 6,108,127 | A | 8/2000 | Atkinson |
| 6,154,310 | A | 11/2000 | Galvanauskas et al. |
| 6,178,041 | B1 | 1/2001 | Simon |
| 6,236,779 | B1 | 5/2001 | Kafka et al. |
| 6,243,522 | B1 | 6/2001 | Allan et al. |
| 6,252,665 | B1 | 6/2001 | Williams et al. |
| 6,300,639 | B1 | 10/2001 | Wiederhoeft |
| 6,334,011 | B1 | 12/2001 | Galvanauskas et al. |
| 6,334,019 | B1 | 12/2001 | Birks et al. |
| 6,356,088 | B1 | 3/2002 | Simon et al. |
| 6,369,928 | B1 | 4/2002 | Mandella et al. |
| 6,396,053 | B1 | 5/2002 | Yokoi |
| 6,404,966 | B1 | 6/2002 | Kawanishi et al. |
| 6,424,665 | B1 | 7/2002 | Kwiat et al. |
| 6,462,345 | B1 | 10/2002 | Simon et al. |
| 6,514,784 | B1 | 2/2003 | Dubowski |
| 6,567,164 | B2 | 5/2003 | Birk et al. |
| 6,594,074 | B1 | 7/2003 | Wolleschensky et al. |
| 6,611,643 | B2 | 8/2003 | Birk et al. |
| 6,654,166 | B2 | 11/2003 | Birk et al. |
| 6,658,183 | B1 | 12/2003 | Chandalia et al. |
| 6,710,918 | B2 | 3/2004 | Birk et al. |
| 6,721,476 | B2 | 4/2004 | Padmanabhan et al. |
| 6,744,555 | B2 | 6/2004 | Galvanauskas et al. |
| 6,788,456 | B2 | 9/2004 | Knebel |
| 6,796,699 | B2 | 9/2004 | Birk et al. |
| 6,848,825 | B1 | 2/2005 | Simon et al. |
| 6,885,683 | B1 | 4/2005 | Fermann et al. |
| 6,888,853 | B1 | 5/2005 | Jurgensen |
| 2002/0028044 | A1 | 3/2002 | Birk et al. |
| 2002/0043622 | A1 | 4/2002 | Birk et al. |
| 2004/0028356 | A1 | 2/2004 | Birks et al. |
| 2004/0075883 | A1 | 4/2004 | Galvanauskas et al. |

FOREIGN PATENT DOCUMENTS

| | | |
|---|---|---|
| DE | 44 46 185 A1 | 2/1996 |
| DE | 196 22 359 A1 | 12/1997 |
| DE | 197 02 753 A1 | 7/1998 |
| DE | 197 33 195 A1 | 2/1999 |
| DE | 199 06 757 A1 | 12/1999 |
| DE | 198 29 944 A1 | 1/2000 |
| DE | 198 29 954 A1 | 1/2000 |
| DE | 198 53 669 A1 | 11/2000 |
| EP | 0 495 930 B1 | 7/1992 |
| EP | 0 841 557 A2 | 5/1998 |
| EP | 0 592 089 B1 | 7/1998 |
| EP | 0 886 174 A2 | 12/1998 |
| EP | 0 495 930 B1 | 4/1999 |
| JP | 4-003426 U | 1/1992 |
| JP | 8-211296 A | 8/1996 |
| JP | 11-500832 A | 1/1999 |
| JP | 11-174332 A | 7/1999 |
| JP | 11-284260 A | 10/1999 |
| JP | 11-326775 A | 11/1999 |
| JP | 2000-035400 A | 2/2000 |
| JP | 2000-047117 A | 2/2000 |
| WO | WO 97/21979 A1 | 6/1997 |
| WO | WO 99/00685 A1 | 1/1999 |
| WO | WO 00/04613 A1 | 1/2000 |
| WO | WO 00/13839 A1 | 3/2000 |
| WO | WO 00/49435 A1 | 8/2000 |

OTHER PUBLICATIONS

J. Ranka et al., "Visible Continuum Generation in Air-Silica Microstructure Optical Fibers with Anomalous Dispersion at 800 nm," Optics Letters, Jan. 2000, vol. 25, No. 1, pp. 25-27.

R. F. Cregan et al., "Single-Mode Photonic Band Gap Guidance of Light in Air," Science, vol. 285, Sep. 3, 1999, pp. 1537-1539.

S.E. Barkou et al., "Silica-Air Photonic Crystal fiber Design that Permits Waveguiding by a True Photonic Bandgap Effect," Optics Letters, vol. 24, No. 1, Jan. 1, 1999, pp. 46-48.

Birks et al., "Supercontinuum Generation in Tapered Fibers", Optics Letters, vol. 25, No. 19, Oct. 1, 2000, pp. 1415-1417.

M. D. Schaeberle et al., "Multiplexed Acousto-Optic Tunable Filter (AOTF) Spectral Imaging Microscopy," SPIE vol. 2173, pp. 11-20.

D.R. Suhre et al., "White-light imaging by use of a multiple passband acousto-optic tunable filter," Applied Optics, vol. 35, No. 22, Aug. 1, 1996, pp. 4494-4501.

T. C. Brelje, et al., "Multicolor Laser Scanning Confocal Immunofluorescence Microscopy: Practical Application and Limitations," Methods In Cell Biology, vol. 38, pp. 97, 118-123.

G. Schmtiz et al., "Fluorescence recovery after photobleaching measured by confocal microscopy as a tool for the analysis of vesicular lipid transport and plasma membrane mobility," SPIE, vol. 3260, pp. 127-134.

S. W. Hell et al., "Pulsed and cw confocal microscopy: a comparison of resolution and contrast," Optics Communications, vol. 113 (1994) pp. 144-152.

K. Mori et al., "Ultrawide Spectral Range Group-Velocity Dispersion Measurement Utilizing Supercontinuum in an Optical Fiber Pumped by a 1.5 μm Compact Laser Source," IEEE Transactions on Instrumentation and Measurement, vol. 44, No. 3, Jun. 1995, pp. 712-715.

T. Morioka et al., "Transformed-limited, femtosecond WDM pulse generation by spectral filtering of gigahertz supercontinuum," Electronics Letters, vol. 30, No. 14, Jul. 7, 1994, pp. 1166-1168.

J. F. Ranka et al., "Efficient visible continuum generation in air-silica microstructure optical fibers with anomalous dispersion at 800 nm," Technical Digest, Conference on Lasers and Electro-Optics, May 23-28, 1999, pp. CPD8-1 and CPD8-2.

US 7,679,822 B2

BROADBAND LASER ILLUMINATION DEVICE FOR A SCANNING MICROSCOPE WITH OUTPUT STABILIZATION

CROSS REFERENCE TO RELATED APPLICATIONS

The present application is a divisional of U.S. application Ser. No. 11/580,065, filed Oct. 13, 2006, which is a continuation of U.S. application Ser. No. 11/034,888, filed Jan. 14, 2005, which is a divisional of U.S. application Ser. No. 09/881,062, filed Jun. 15, 2001, which claims priority of German Patent Application Nos. 100 30 013.8, filed Jun. 17, 2000 and 101 15 509.3, filed Mar. 29, 2001, the entire contents of each application is incorporated herein by reference.

FIELD OF THE INVENTION

The invention concerns an arrangement for examining microscope preparations with a scanning microscope, In particular, the invention concerns an arrangement for examining microscopic preparations with a scanning microscope that comprises a laser and an optical means which images the light generated by the laser onto a specimen that is to be examined. The scanning microscope can also be configured as a confocal microscope.

The invention furthermore concerns an illumination device for a scanning microscope.

BACKGROUND OF THE INVENTION

In scanning microscopy, a specimen is scanned with a light beam. Lasers are often used as the light source for this purpose. An arrangement having a single laser which emits several laser lines is known, for example, from EP 0 495 930, "Confocal microscope system for multi-color fluorescence." Mixed-gas lasers, in particular ArKr lasers, are usually used at present for this purpose.

Diode lasers and solid-state lasers are also in use.

U.S. Pat. No. 5,161,053 entitled "Confocal microscope" discloses a confocal microscope in which light of an external light source is transported with the aid of a glass fiber to the beam path of the microscope and the end of the glass fiber serves as a point light source, so that a mechanical stop is superfluous.

The emission spectrum of lasers is confined to a narrow wavelength range, so that for simultaneous multiple-line excitation, the light of several lasers must be combined into one illumination beam.

The gas lasers usually used as multiple-line lasers are very complex and expensive. They moreover require a great deal of maintenance, making them difficult to use continuously in many microscopy applications.

SUMMARY OF THE INVENTION

It is the object of the invention to create a scanning microscope which makes possible specimen examination with several spectral lines without requiring the use of multiple-line lasers or more than one laser.

The aforesaid object is achieved by a scanning microscope comprising: a laser, an optical means for imaging light generated by the laser onto a specimen and an optical component positioned between the laser and the optical means, wherein the light generated by the laser passes through the optical component whereby the optical component spectrally spreads the light passing through.

A further object of the invention is to create an illumination device for a scanning microscope which provides an illumination encompassing a numerous selectable spectral regions.

The aforesaid object is achieved by an illumination device comprising a laser which has a light exit opening, an optical component made of photonic band-gap material which is mounted at the light exit opening.

It a further object of the invention to create a confocal scanning microscope which makes possible specimen examination with several spectral lines without requiring the use of multiple-line lasers or more than one laser.

The aforesaid object is achieved by a confocal scanning microscope comprising: a laser, an optical means for imaging light generated by the laser onto a specimen, a detector for receiving light coming from the specimen, an optical component positioned between the laser and the optical means, wherein the light generated by the laser passes through the optical component, whereby the optical component spectrally spreads the light passing through and an illumination pinhole through which the specimen is illuminated by the light emerging from the optical component.

It a further object of the invention to create a scanning microscope which makes possible specimen examination with several spectral lines without requiring the use of multiple-line lasers or more than one laser and which is realized in a simple and cost effective way.

The aforesaid object is achieved by a scanning microscope comprising: a pulsed laser, an optical means for imaging light generated by the pulsed laser onto a specimen and a tapered light-guiding fiber positioned between the pulsed laser and the optical means, wherein the light generated by the pulsed laser passes through the tapered light-guiding fiber whereby the tapered light-guiding fiber spectrally spreads the light passing through.

The optical component in the form of a photonic band-gap material has the advantage that the optically nonlinear construction of the fiber causes a short laser pulse to be spread out, thus creating a spectrally broad, continuous light spectrum.

A "photonic band-gap material" is a microstructured, transparent material. It is possible, usually by assembling various dielectrics, to impart to the resulting crystal a band structure which is reminiscent of the electron band structure of semiconductors.

The technology has recently also been implemented in light-guiding fibers. The fibers are manufactured by drawing out structured glass tubes. The fibers have a particular underlying structure: small capillaries are left open in the fiber direction, spaced approximately 2-3 µm apart and with a diameter of approx. 1 µm, and usually filled with air. No capillaries are present in the center of the fiber. These kinds of fibers are known as "photon crystal fibers," "holey fibers," or "microstructured fibers."

Photon crystal fibers can be used to produce a continuous spectral distribution over the entire visible wavelength region. This is done by coupling the light of a short-pulse laser into the fiber. The optically nonlinear construction of the fiber causes the frequency spectrum of the laser to spread out, creating a spectrally broad, continuous spectrum.

It is an other advantage of the invention to provide an embodiment which is simple an cost effective to realize. The optical component is a light-guiding fiber with a fiber core, wherein the fiber has a thinning provided on a part of the fiber. Light-guiding fibers of that kind are known as "tapered fibers". Preferable, the light-guiding fiber has an overall length of one meter an the thinning is provided over a length of 30 mm to 90 mm. The diameter of the fiber is 150 µm and diameter of the fiber core is approx. 8 µm. A the thinning the diameter of the fiber is reduced to approx. 2 µm. Consequently the diameter of the fiber core is the range of a few nanometers.

For use in microscopy, it is important to implement means for wavelength selection and for light output stabilization. A fiber laser of this kind can therefore advantageously be combined with acoustooptical or electrooptical tunable filters (AOTFs), acoustooptical or electrooptical deflectors (AODs), or acoustooptical or electrooptical beam splitters (AOBSs). These can be used not only for wavelength selection but also to block out detected light (our German application DE 199 06 757 A1: "Optical arrangement").

In confocal microscopy in particular, the fiber exit end can be used as a point light source, thus making the use of an excitation aperture superfluous. With a configuration of this kind, it would be particularly advantageous for the fiber end itself to have a partially reflective coating, so that this partial reflector forms a resonator end mirror.

Further embodiments make provision for apparatuses to compensate for light output fluctuations. It is possible, for example, to incorporate a control loop for light output stabilization, which measures the light output in the beam path of the microscope in parasitic fashion, and maintains a constant specimen illumination light output by, for example, varying the pumping light output or with the aid of an acoustooptical or electrooptical element. LCD attenuators could also be used for this purpose.

A further advantage of the invention is that if the illumination device is already appropriately configured, it supplies several spectral regions for illumination. The laser which constitutes the illumination device for a scanning microscope has an optical component attached at the light exit opening. The optical component is made of photonic band-gap material. The photonic band-gap material can also be configured as a light-guiding fiber.

BRIEF DESCRIPTION OF THE DRAWINGS

The subject matter of the invention is schematically depicted in the drawings and is described below with reference to the Figures, in which.

DETAILED DESCRIPTION OF THE INVENTION

Figure 1:
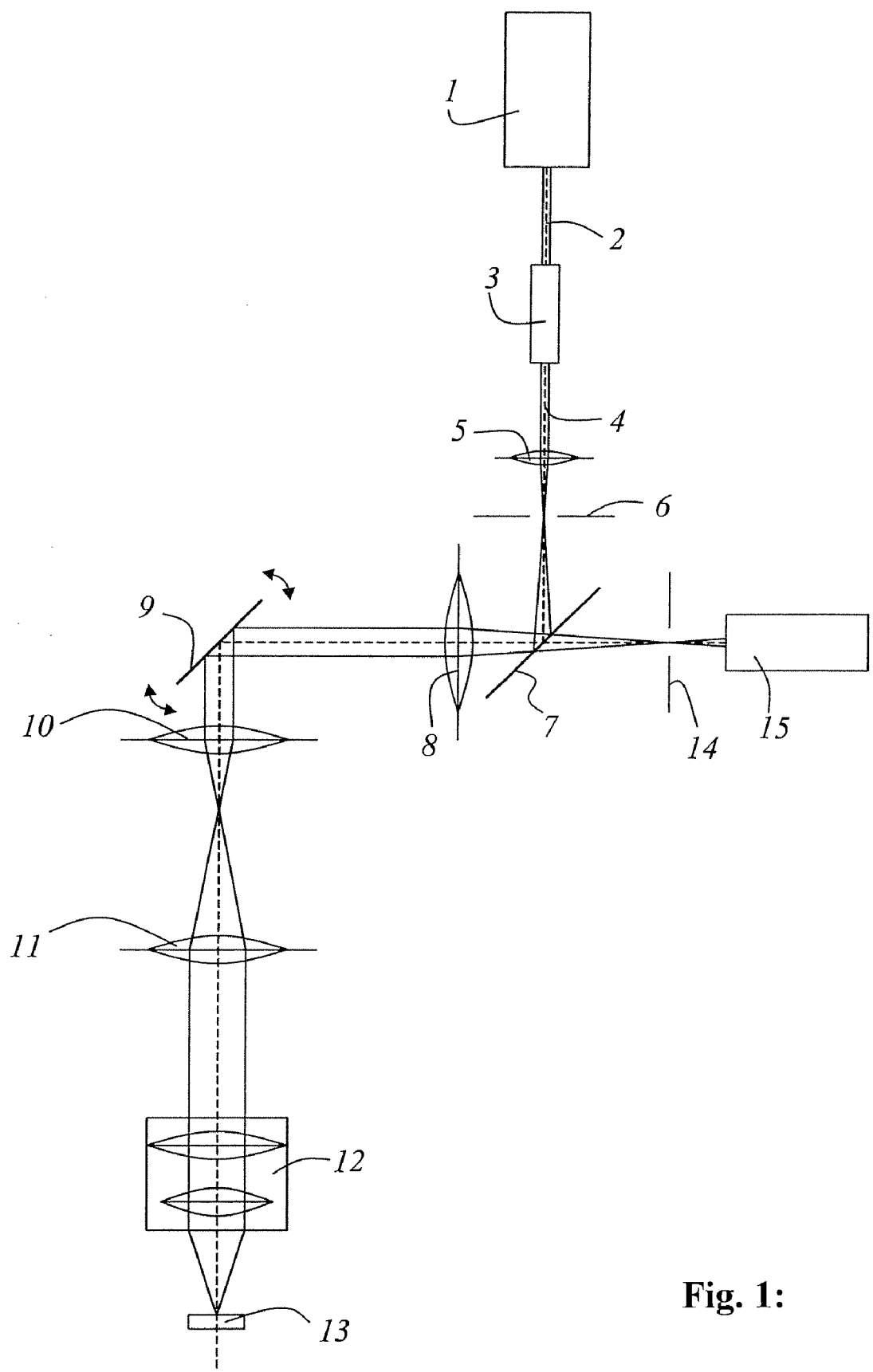
FIG. 1 shows an arrangement according to the present invention with a confocal microscope.

FIG. 1 shows a confocal microscope that uses an optical component 3 to spread out a laser pulse generated by a pulsed laser 1. Pulsed laser 1 defines a pulsed laser beam 2 that is directed through optical component 3. Optical component 3 is a photonic band-gap material. What emerges from optical component 3 is a spectrally broad-band illuminating light 4 that is imaged by a first optical system 5 onto an illumination pinhole 6 and then strikes a beam splitter 7. From beam splitter 7, the spectrally broad-band illuminating light 4 passes to a second optical system 8 which generates a parallel light beam 4a that strikes a scanning mirror 9. Scanning mirror 9 is followed by several optical systems 10 and 11 which shape light beam 4a. Light beam 4a passes to an objective 12, by which it is imaged onto a specimen 13. The light reflected or emitted from the specimen defines an observation beam path 4b. The light of observation beam path 4b passes once again through second optical system 8, and is imaged onto a detection pinhole 14 that sits in front of a detector 15. Optical component 3 makes it possible to generate the laser light necessary for the examination of specimen 13 in accordance with the desired spectrum.

Figure 2:
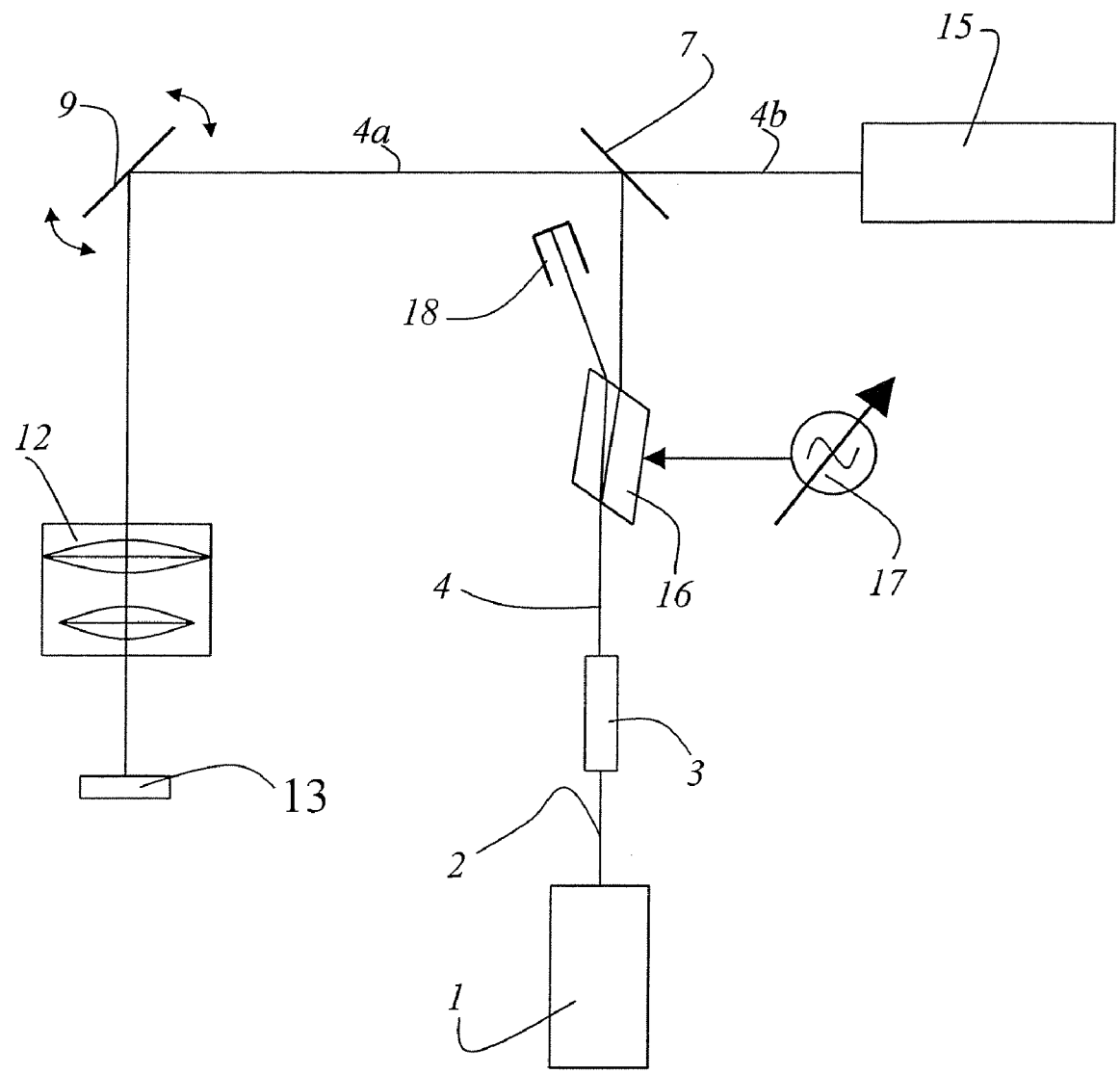
FIG. 2 shows an arrangement in which an illumination pinhole has been omitted.

The exemplary embodiment depicted in FIG. 2 shows a confocal microscope in which illumination pinhole 6 has been omitted. All elements identical to the elements of FIG. 1 are labeled with the same reference characters. In this exemplary embodiment, an acoustooptical tunable filter (AOTF) 16, which is connected to a corresponding AOTF drive system 17, is used instead of first optical system 5. Since optical component 3 can generate a broad-band illuminating light 4, it is necessary to provide means for wavelength selection and for light output stabilization. Advantageously, acoustooptical or electrooptical tunable filters (AOTFs) can be combined with acoustooptical or electrooptical deflectors (AODs) and acoustooptical or electrooptical beam splitters (AOBSs).

These can be used not only for wavelength selection but also to block out detected light. Also associated with AOTF 16 is a beam dump 18 which intercepts the unused spectral portions of the illuminating light in order to prevent unnecessary disturbance of the scanning microscope.

Figure 3:
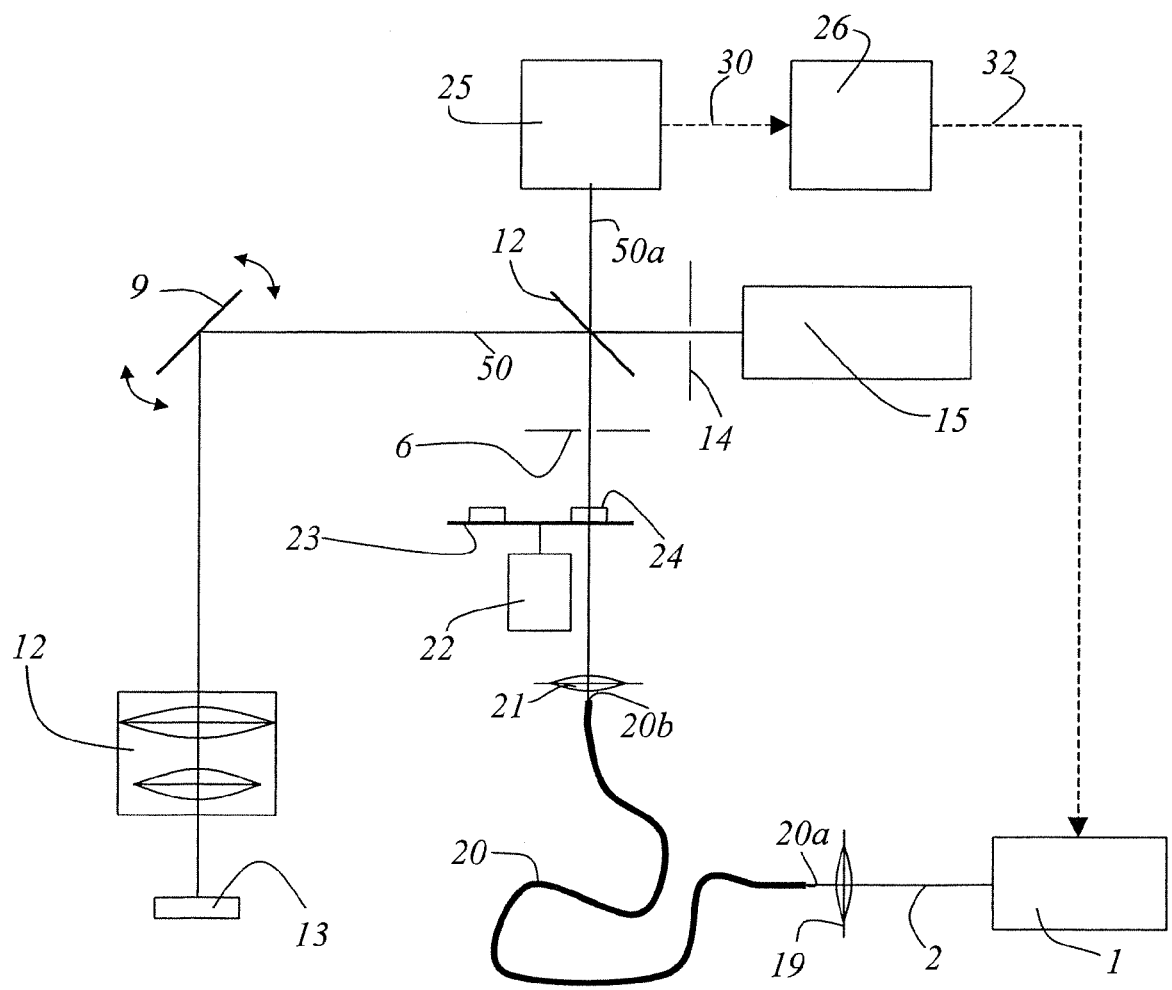
FIG. 3 shows an arrangement with light output stabilization.

A further embodiment of the invention is depicted in FIG. 3. Here a light-guiding fiber 20 made of the photonic band-gap material is used instead of optical component 3. From pulsed laser 1, pulsed laser beam 2 is coupled via an optical system 19 into an entrance end 20a of light-guiding fiber 20. Since light-guiding fiber 20 is constructed from the photonic band-gap material, a spectrally spread laser pulse emerges from exit end 20b and is coupled out via an optical system 21. Before the spectrally spread laser pulse strikes illumination pinhole 6, spectral filtering is performed. For that purpose, several color filters 24 are arranged on a turret 23. Turret 23 can be rotated by a motor 22, so that the corresponding color filters 24 can be introduced into the beam path. Also conceivable is a linear arrangement of color filters 24, in which case color filters 24 are moved by means of a linear motion into an illumination beam path 50. After illumination pinhole 6, illumination beam path 50 is comparable to the beam path of FIG. 1. As already mentioned in FIG. 1, beam splitter 7 deflects the light onto scanning mirror 9. A portion of the light passes through beam splitter 7 and defines a lost beam path 50a. This portion of the light is lost for observation or measurement purposes. For this reason, there is provided in lost beam path 50a a detector 25 which determines the lost light and ascertains therefrom an electronic variable that is conveyed via a line 30 to an electronic control system 26. Electronic control system 26 is connected via a further line 32 to pulsed laser 1. Electronic control system 26 regulates the intensity of pulsed laser 1, via line 32, in such a way that a constant light output always strikes specimen 13. For example, a control loop can be provided for light output stabilization, in such way that it measures the light output in the beam path of the microscope in parasitic fashion, and maintains a constant specimen illumination light output by, for example, varying the pumping light output or with the aid of an acoustooptical or electrooptical element. LCD attenuators could also be used for this purpose.

Figure 4:
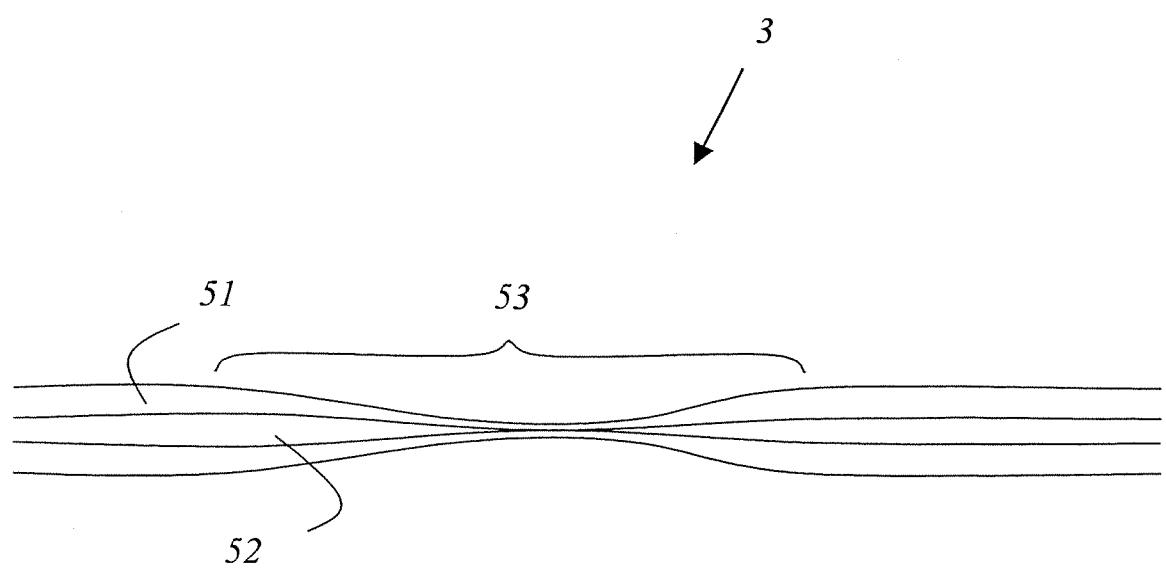
FIG. 4 shows an embodiment of the optical component.

FIG. 4 shows a schematic representation of the optical component 3. The optical component 3 is a conventional light-guiding fiber 51, which has a overall diameter of 125 µm and the fiber core 52 has a diameter of 6 µm. In the area of a thinning 53, which is approx. 300 mm long, the overall diameter of the light-guiding fiber 51 is reduced 1.8 μm. In this area the diameter of the fiber core 52 is in the range of a few nanometers.

Figure 5:
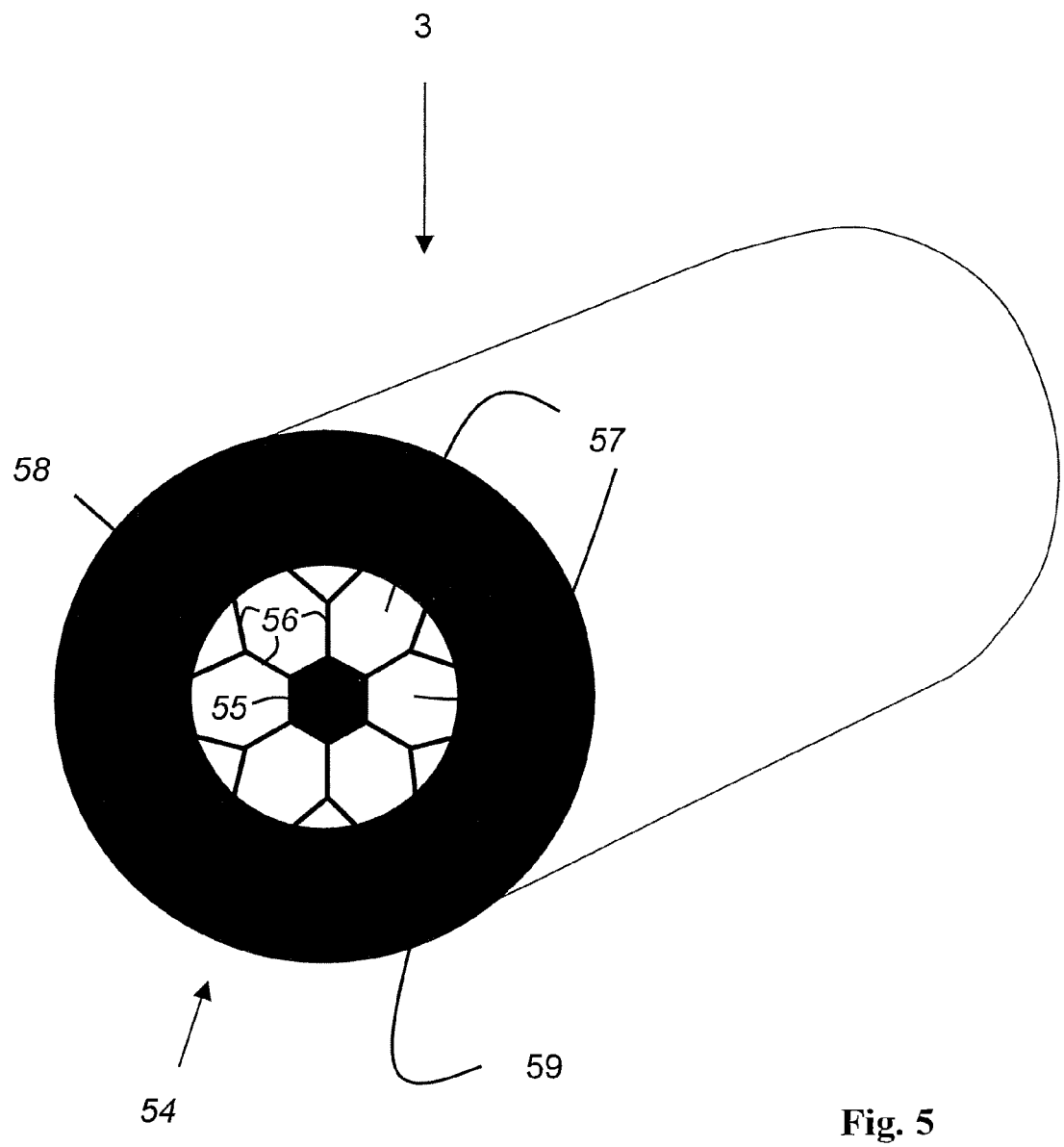
FIG. 5 shows a further embodiment of the optical component.

FIG. 5 shows a further embodiment of the optical component 3. The optical component 3 is a microstructured optical element. It consists of photonic band gap material, which has a special honeycombed microstructure 54. The honeycombed structure 54 that is shown is particularly suitable for generating broadband light. The diameter of the glass inner cannula 55 is approximately 1.9 μm. The inner cannula 55 is surrounded by glass webs 56. The glass webs 56 form honeycombed cavities 57. These micro-optical structure elements together form a second region 58, which is enclosed by a first region 59 that is designed as a glass cladding.

The present invention was described with reference to particular embodiments. It is self-evident, however, that changes and modifications can be made without leaving the spirit and the scope of the claims.

What is claimed is:

1. An optical system for use in microscopy comprising:
   a laser configured to generate light having a wavelength range;
   imaging optics configured to image light generated by the laser onto an image plane;
   an optical component positioned between the laser and the imaging optics,
   wherein the light generated by the laser passes through the optical component, and
   wherein the optical component is configured to increase said wavelength range of said light to a substantial portion of the entire visible wavelength range;
   an attenuator for attenuating at least a portion of at least one wavelength of light emerging from the optical component, and
   wherein the attenuator comprises at least one of a spectrally selective filter, an acoustooptical tuneable filter (AOTF), an acoustooptical deflector (AOD) and an LCD, and
   wherein the laser comprises a pulsed laser; and
   a control loop for light output stabilization, which measures the light output in the beam path of the imaging optics and which maintains a constant specimen illumination light output by varying pumping light output of the pulsed laser or with the aid of an acoustooptical or electrooptical element.

2. An optical system as defined in claim 1, wherein the optical component comprises photonic band-gap material.

3. An optical system as defined in claim 2, wherein the photonic band-gap material is configured as a light-guiding fiber.

4. An optical system as defined in claim 1, wherein the optical component comprises a tapered light-guiding fiber.

5. An optical system as defined in claim 1, wherein the system comprises a microscope.

* * * * *